United States Patent [19]

Sinek

[11] 4,416,836

[45] Nov. 22, 1983

[54] INDUCED DRAFT COOLING TOWER

[75] Inventor: Joachim R. Sinek, Pittsford, N.Y.

[73] Assignee: Kennecott Corp., Cleveland, Ohio

[21] Appl. No.: 326,947

[22] Filed: Dec. 3, 1981

[51] Int. Cl.³ .............................................. B01F 3/04
[52] U.S. Cl. ..................................... 261/112; 52/196;
52/247; 261/DIG. 11
[58] Field of Search ....................... 261/DIG. 11, 112;
52/247, 245, 196; 425/435

[56] References Cited

U.S. PATENT DOCUMENTS

| | | | |
|---|---|---|---|
| 2,809,818 | 10/1957 | Munters | 261/DIG. 11 |
| 2,990,031 | 6/1961 | Michael | 261/DIG. 11 |
| 3,099,696 | 7/1963 | Meek | 261/DIG. 11 |
| 3,395,903 | 8/1968 | Norback et al. | 261/DIG. 11 |
| 3,443,263 | 5/1969 | Minasy | 52/245 |
| 3,510,911 | 5/1970 | Altor | 425/435 |
| 3,524,780 | 8/1970 | Clements | 52/245 |
| 3,672,103 | 6/1972 | Kost | 52/245 |
| 3,676,037 | 7/1972 | Pivar | 425/435 |
| 3,703,348 | 11/1972 | Pivar | 425/435 |
| 3,731,461 | 5/1973 | Hamon | 261/DIG. 11 |
| 3,739,556 | 6/1973 | Waters | 261/DIG. 11 |
| 3,810,727 | 5/1974 | Pivar | 425/435 |
| 3,825,395 | 7/1974 | Pivar . | |
| 3,841,821 | 10/1974 | Pivar . | |
| 3,865,799 | 2/1975 | Katagiri | 261/DIG. 11 |
| 3,865,911 | 2/1975 | Lefevre | 261/DIG. 11 |
| 3,914,105 | 10/1975 | Pivar . | |
| 3,997,649 | 11/1976 | Pivar . | |
| 4,022,564 | 5/1977 | Dawson . | |
| 4,068,777 | 1/1978 | Humphrey | 52/247 |
| 4,092,379 | 5/1978 | Saxton | 261/DIG. 11 |
| 4,252,751 | 2/1981 | Shito | 261/DIG. 11 |

FOREIGN PATENT DOCUMENTS

| | | | |
|---|---|---|---|
| 181384 | 11/1962 | Sweden | 52/245 |
| 783453 | 11/1980 | U.S.S.R. | 52/245 |

OTHER PUBLICATIONS

Shinwa Co. Cooling Tower Brochure entitled "Unique Features: Construction of SBC Series Cooling Tower", 1979.

Primary Examiner—Tim R. Miles
Attorney, Agent, or Firm—Porter & Associates Co.

[57] ABSTRACT

An induced draft cooling tower includes a unitary, seamless shell fabricated from a rust-free, plastics material. The cooling tower operates on the counterflow principle whereby a fluid to be cooled is directed downwardly through a block of cellular packing disposed within the tower, while cooling air is drawn upwardly through the cellular packing and is exhausted at the top of the tower. A fan is mounted atop the tower for purposes of drawing air through the tower. The shell includes a polygonal lower portion for easier formation of air inlets and for attachment of plumbing fixtures. The shell is fabricated from an inexpensive, relatively weak plastics material; however, due to the configuration of the shell, the tower possesses favorable strength characteristics and avoids the need for any supplementary structural supports made of very strong material such as steel or fiberglass reinforced polyester.

13 Claims, 14 Drawing Figures

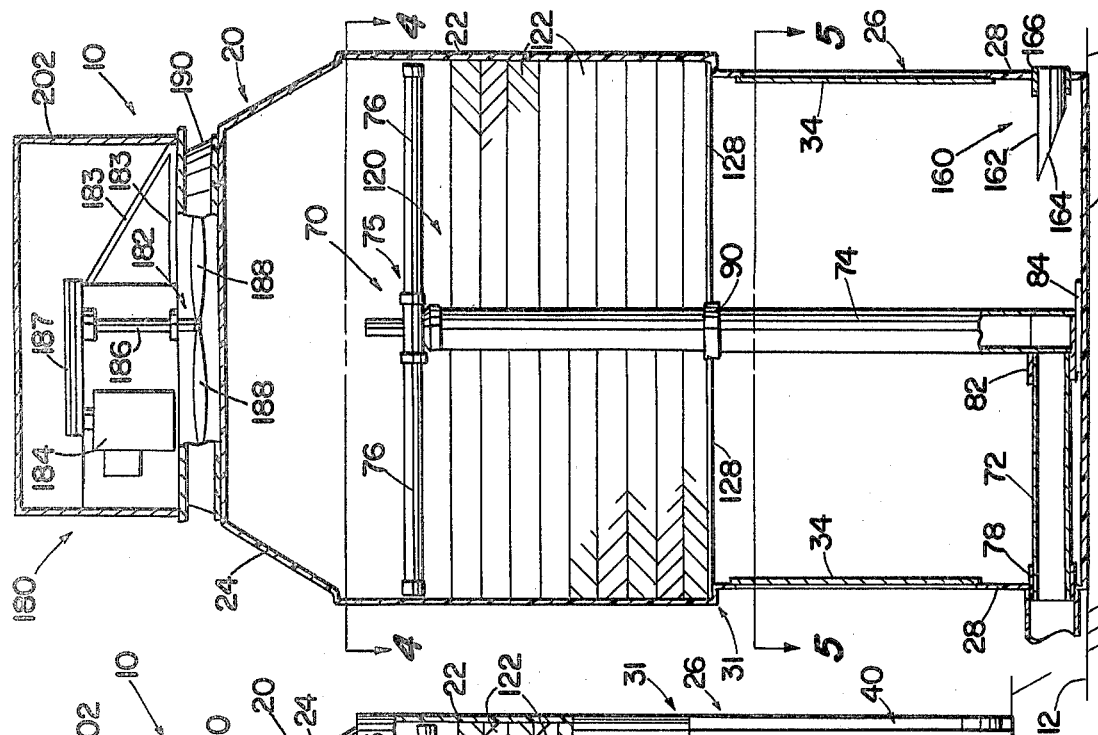
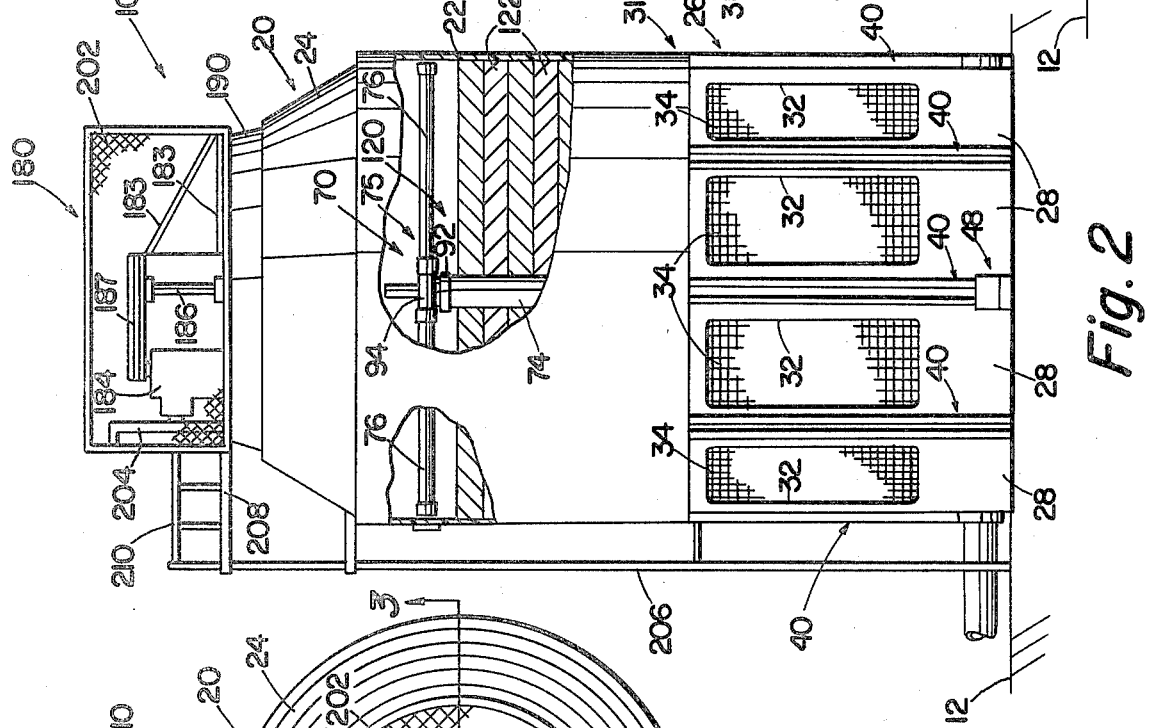
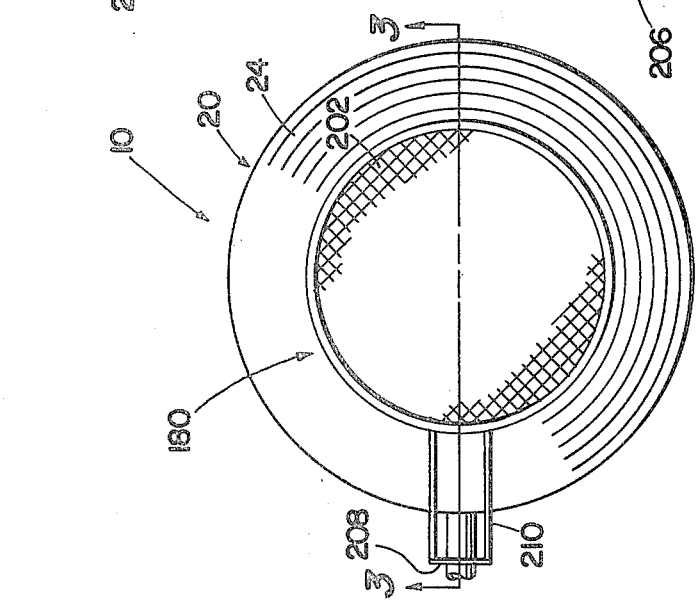

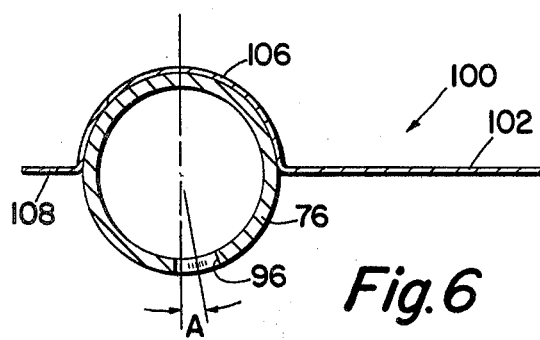
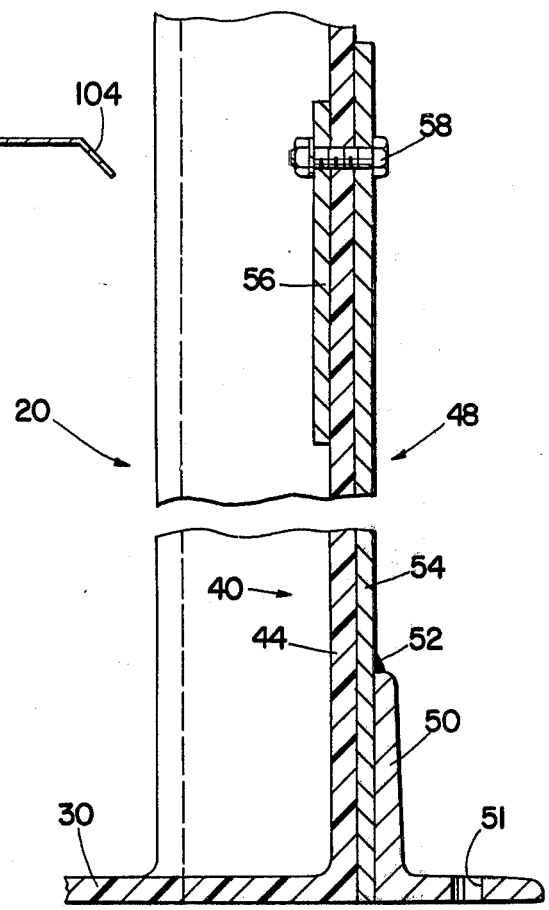
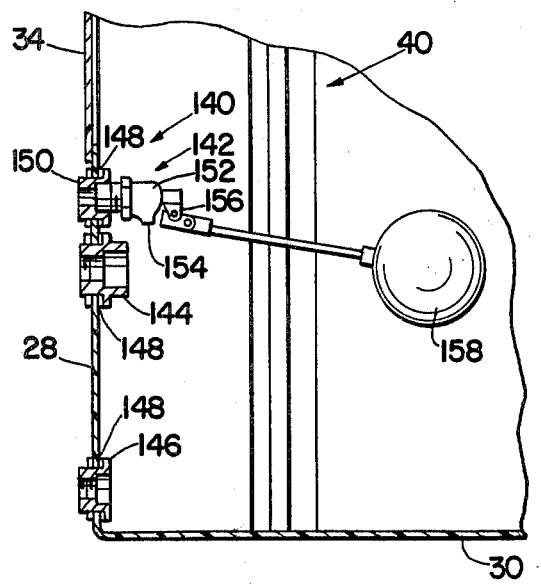
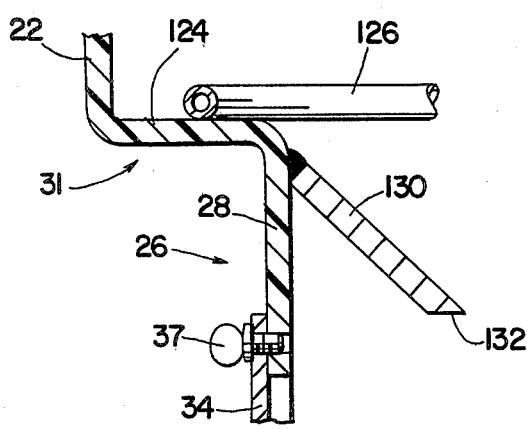
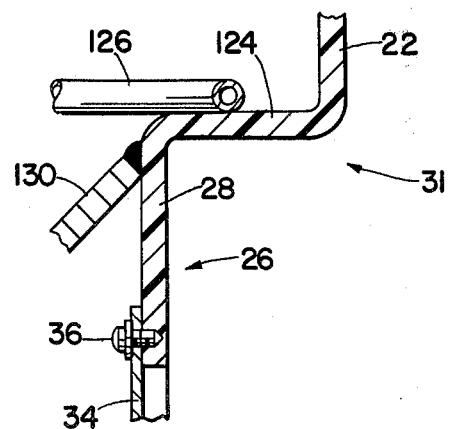

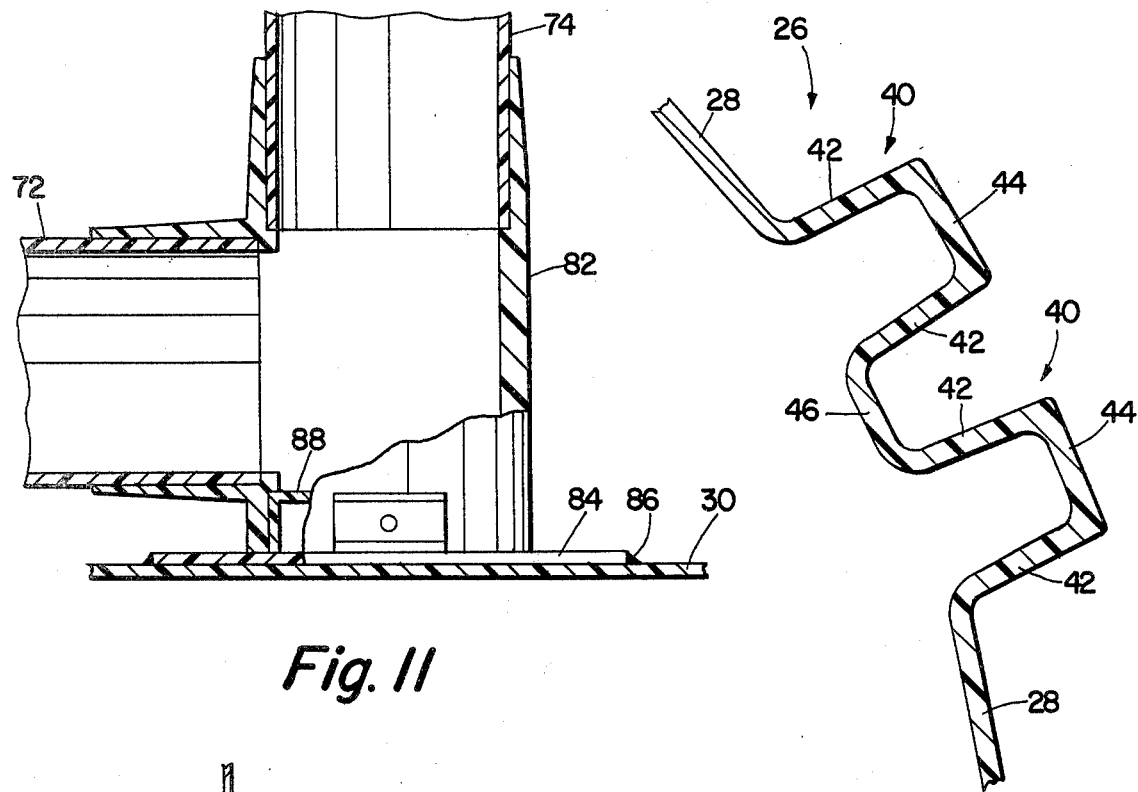
Fig. 11
Fig. 12
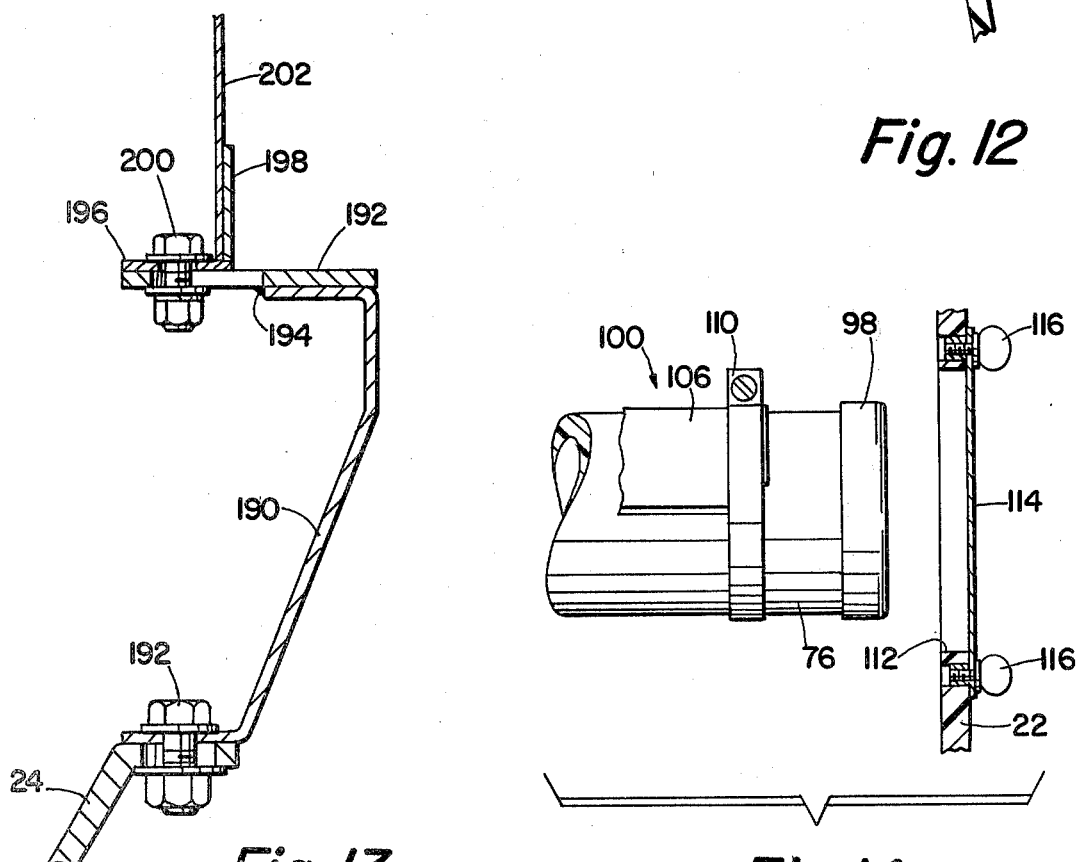
Fig. 13
Fig. 14

INDUCED DRAFT COOLING TOWER

CROSS-REFERENCE TO RELATED APPLICATION

SHELL FOR INDUCED DRAFT COOLING TOWER, design patent application Ser. No. 326,947, filed concurrently by J. R. Sinek.

BACKGROUND OF THE INVENTION

1. Field of the Invention

The invention relates to towers for cooling heated fluids such as water and, more particularly, to a cooling tower operating on the induced draft principle and employing a unitary shell fabricated from an inexpensive plastics material.

2. Description of the Prior Art

Many industrial applications require that heated fluids such as water be cooled down before the fluids can be used for other purposes. The discussion that follows will refer to water as the fluid being cooled although it should be understood that the invention can have applicability to other fluids.

In order to cool heated water, a commonly used method is to bring it into direct contact with ambient air impelled by one or more fans, in a so-called mechanical draft cooling tower. These cooling towers have been divided into two general types. The first type operates on the forced draft principle whereby a fan located at ground level pumps air under pressure into the tower through ductwork. The pressurized air, upon being brought into contact with hot water, will cool the water. The second type of cooling tower is known as an induced draft tower whereby a fan is connected to the tower and draws air through the tower, thereby "inducing" a flow of cooling air through the tower. In most induced draft cooling towers, the fan is positioned directly atop the tower, thereby eliminating the need for ductwork connecting the tower outlet to the fan inlet. In either a forced draft cooling tower or an induced draft cooling tower, the flow of water through the tower may be opposite to that of the airflow (counterflow), or it may be across the direction of airflow (crossflow). In either case, a heat exchanger in the form of a block of cellular packing is disposed within the tower to provide maximum contact between the air and the water.

Forced draft cooling towers have the advantage that the fan and its associated ductwork do not need to be supported by the tower structure itself. The fan and associated ductwork often are quite heavy and it is advantageous to be able to use a less expensive, relatively weak tower. Although the structural requirements of forced draft cooling towers are favorable, the cooling efficiency of forced draft cooling towers is not as great. This is because the air usually is directed into the tower at only one location. It is very difficult, if not impossible, to design the interior of the tower to produce uniform airflow. Accordingly, the efficiency of a forced draft cooling tower is not as great as desired.

Induced draft cooling towers, on the other hand, are more efficient than forced draft cooling towers because air can be drawn into the lower portion of the tower through a plurality of inlets equidistantly spaced about the circumference of the tower. A very even airflow pattern will result. Unfortunately, as has been indicated already, the strength of the tower must be increased in order to accommodate the extra weight of the fan. Moreover, the added cross-sectional area of the fan located atop the tower makes it more difficult for the tower to withstand windstorms. Yet an additional consideration is that if many air inlets are provided, the remaining portion of the tower intermediate the inlets may be loaded too heavily; that is, the greater the number of air inlets, the weaker the base of the tower.

Prior induced draft cooling towers, in order to attain adequate structural strength, have required either that the tower be manufactured from a very strong material such as steel or that the tower employ external steel reinforcing members. The most important drawback of a steel construction is that is eventually will rust, thereby significantly shortening the life of the tower. In addition, steel construction is expensive, difficult to transport, difficult to assemble on-site and requires greater structural support in the surface on which the tower is disposed. Even if a lightweight, rust-free material such as a plastics material is employed for the tower, it has been found necessary to use a strong, expensive plastics material such as fiberglass reinforced polyester (FRP), and, in addition, to augment the FRP with external steel supports. The resultant construction, although strong, also is very expensive.

Desirably, an induced draft cooling tower would be manufactured of an inexpensive, rust-free plastics material such as polyethylene, and, at the same time, would avoid the need for supplementary structural members. It also would be desirable to provide an induced draft cooling tower having many flat surfaces near its lower end for easy fabrication of air inlets, for easy attachment of various plumbing fixtures, and for easy attachment of anchor lugs connected to a concrete pad or other supporting base. It also would be desirable to support the cellular packing and other components within the tower with a minimum number of attachment fittings, not only to avoid the need for rust-susceptible elements, but also to conserve expense and weight.

SUMMARY OF THE INVENTION

The present invention overcomes the foregoing and other deficiencies of prior art induced draft cooling towers and accomplishes the foregoing objectives by providing a counterflow, induced draft cooling tower wherein a block of cellular packing is disposed within the tower and wherein fluid to be cooled is passed downwardly through the packing and cooling air is passed upwardly through the packing.

In its preferred embodiment, the invention includes a unitary, seamless shell fabricated from a plastics material, the shell having a generally cylindrical upper portion and a lower portion, the lower portion including a plurality of air inlet openings and strengthening sections intermediate the air inlet openings. The strengthening sections, when viewed in cross section, are in the form of corrugations. It has been found that the corrugations will provide sufficient structural strength that the shell can be provided with a constant wall thickness and, moreover, the need for supplementary structural members is avoided entirely. In preferred form, the lower portion of the shell is polygonal and the air inlets are located in the flat wall sections. The flat walls of the lower portion also provide easy attachment for various plumbing fixtures, and easy connection of the shell to anchor lugs connected to a mounting pad or platform.

In order to minimize manufacturing expense, the shell is manufactured in a so-called roto-molding process using a relatively inexpensive plastics material such as polyethylene. Manufacture of the shell can be accomplished pursuant to the disclosures in one or more of the following United States patents assigned to Rototron Corporation, the disclosures of which are incorporated herein by reference: U.S. Pat. Nos. 3,510,911, 3,676,037, 3,703,348, 3,810,727, 3,825,395, 3,841,821, 3,914,105, 3,997,649 and 4,022,564.

A feature of the invention is the transition between the upper and lower portions of the shell. The transition region is in the form of a ledge capable of supporting the packing at a desired vertical position within the shell without the need for fasteners of any kind. The upper portion of the shell includes a tapered conical portion having a flanged surface at its upper end. The flanged surface enables an air exhaust device such as a fan to be attached to the top of the tower.

By use of a shell according to the invention in an induced draft cooling tower, the expense of the tower is markedly reduced. The tower is very light in weight and can be transported and assembled on-site in one piece with a minimum of difficulty. The number of potentially rust-susceptible components are reduced to a minimum. Even though an inexpensive, relatively weak plastics material is utilized for the shell, the tower retains adequate structural strength without the need for supplementary supports of any kind. These and other features and advantages, and a fuller understanding of the invention, may be had by referring to the following description and claims, taken in conjunction with the accompanying drawings.

DESCRIPTION OF THE DRAWINGS

FIG. 1 is a plan view of an induced draft cooling tower according to the invention;

FIG. 2 is a side elevational view of the induced draft cooling tower according to the invention, with portions of a shell being broken away and removed for clarity;

FIG. 3 is a cross-sectional view of the tower according to the invention, taken along a plane indicated by line 3—3 in FIG. 1, with a ladder removed for clarity of illustration;

FIG. 6 is a cross-sectional view of a portion of a water distribution system employed with the invention, taken along a plane indicated by line 6—6 in FIG. 4;

FIG. 7 is a cross-sectional view of a valve assembly employed with the invention, taken along a plane indicated by line 7—7 in FIG. 5;

FIG. 8 is a cross-sectional view of an anchor lug employed with the invention, taken along a plane indicated by line 8—8 in FIG. 5;

FIGS. 9 and 10 are enlarged, partly cross-sectional views of a ledge structure according to the invention;

FIG. 11 is an enlarged, partly cross-sectional view of a portion of the water distribution system according to the invention;

FIG. 12 is an enlarged, cross-sectional view of a strengthening section employed with the invention;

FIG. 13 is an enlarged, partly cross-sectional view of a portion of a fan and motor assembly employed with the invention; and FIG. 14 is an enlarged, partially cross-sectional view of a portion of the water distribution system and an inspection window employed with the invention.

DESCRIPTION OF THE PREFERRED EMBODIMENT

Figure 4:
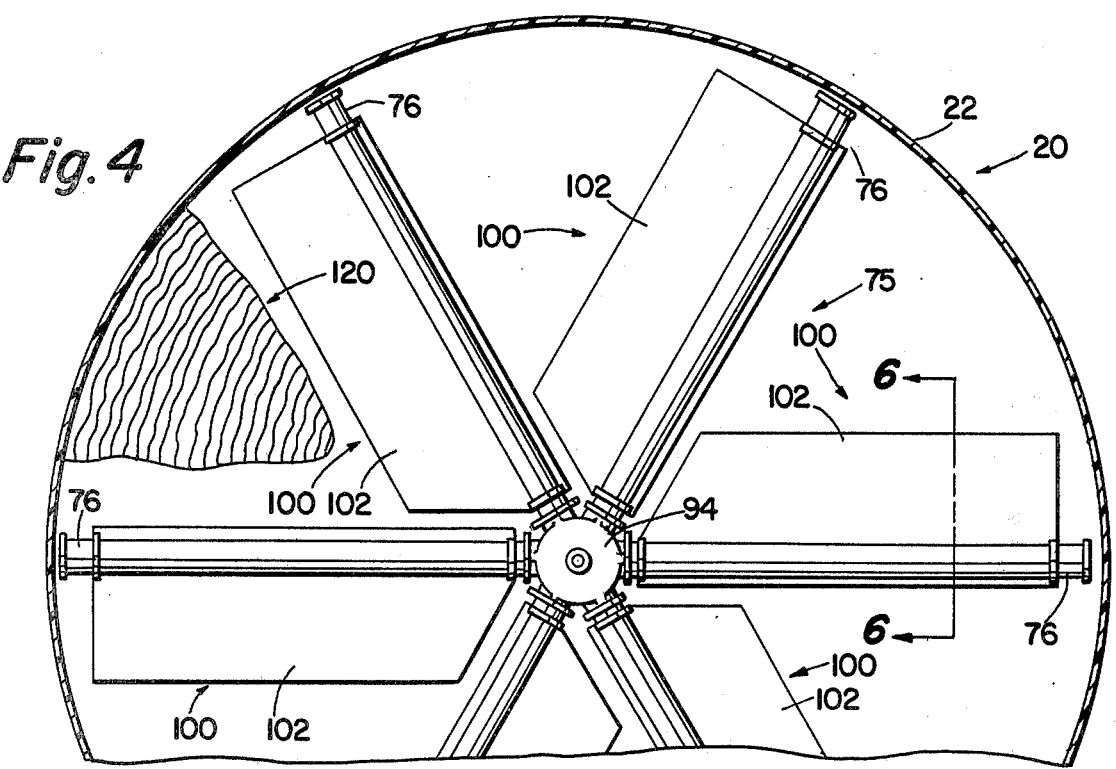
FIG. 4 is a cross-sectional view of the cooling tower according to the invention, taken along a plane indicated by line 4—4 in FIG. 3.

Referring to FIGS. 1-3, an induced draft cooling tower is identified by the reference numeral 10. The tower 10 is positioned such that its longer dimension is oriented vertically, and the tower 10 is secured to a mounting pad or platform 12. The tower 10 is of the counterflow type wherein heated water is permitted to fall through the tower 10, while a current of air is drawn into the base of the tower 10, is pulled upwardly through the tower 10, and is discharged at the top of the tower 10. After falling to the bottom of the tower 10, the water will have been cooled by contact with the air. The water can be collected at the bottom of the tower 10 and pumped elsewhere for various purposes.

In order to carry out the foregoing functions, the tower 10 includes a shell 20 for supporting the various components of the tower 10, a water distribution system 70, a heat exchanger 120, various plumbing fixtures 140, 160, and an air exhaust device 180. These components of the tower 10 will be described individually.

I. The Shell 20

The shell 20 is a unitary, seamless, generally cylindrical structure formed entirely of an inexpensive plastics material such as polyethylene. The shell 20 is watertight except for certain predetermined openings. It has been found that the shell 20 is as strong as known steel shells, although it weighs only half as much and is far less expensive.

Referring to the various FIGURES, particularly FIGS. 1-5, 8-10, and 12, the shell 20 includes a generally cylindrical upper portion 22, a conical upper end portion 24, and a polygonal lower portion 26. In a tower 10 having a cooling capacity of 200 tons (3,000,000 B.T.U. per hour), the shell 20 is approximately 19 feet high and 9.5 feet in diameter. The shell 20 is formed entirely of a plastics material such as polyethylene having a wall thickness of about 7/16 inch. The wall thickness is substantially constant throughout the shell 20. The shell 20 can be formed in a so-called roto-molding process pursuant to the disclosures in one or more of the following U.S. Pat. Nos. assigned to Rototron Corporation: 3,510,911, 3,676,037, 3,703,348 3,810,727, 3,825,395, 3,841,821, 3,914,105, 3,997,649 and 4,022,564.

A feature of the invention is the construction of the polygonal lower portion 26. The lower portion 26 includes a plurality of flat walls 28 extending from a base 30 of the shell 20 to a transition region 31 connecting the upper and lower portions 22, 26. In the embodiment illustrated, twelve walls 28 are provided, each having a rectangular air inlet 32. In order to permit maximum airflow through the tower 10 with the least pressure drop, the air inlets 32 are quite large, approximately 51 inches by 17 inches. Each of the air inlets 32 is covered by a polyethylene mesh screen 34 secured by fasteners 36 to the inside of the wall 28. One of the screens (FIGS. 5, 7, and 9) is secured to the outside of the wall 28 by thumbscrews 37 in order to provide access to the interior of the shell 20. The air inlets 32 are equidistantly spaced about the circumference of the shell 20, thereby providing optimum airflow characteristics for the tower 10.

The regions of the lower portion 26 intermediate the walls 28 are occupied by strengthening sections, or corrugations 40. Because the air inlets 32 are very large, the regions of the lower portion 26 available for the corrugations 40 are not very great. Hence, the cross-section of the corrugations 40 must have a large moment of inertia to prevent buckling. Referring particularly to FIG. 12, each corrugation 40 includes two generally parallel, radially extending portions 42, and a radially outermost connecting portion 44. The corrugations 40 are connected by a radially innermost connecting portion 46. The portions 42 extend radially for approximately 3-1/16 inches, while the portions 44 are approximately 2-13/16 inches wide. The intersections between the portions 42 and the portions 44 are rounded, and fillets of approximately ½ inch radius smoothly interconnect the walls 28 and the portions 42, 44, 46. Referring particularly to FIG. 2, the diameter of the portions 44 approximates that of the upper portion 22, although the diameter of the upper portion 22 is slightly larger to facilitate removal of the shell 20 from its molding apparatus.

Figure 5:
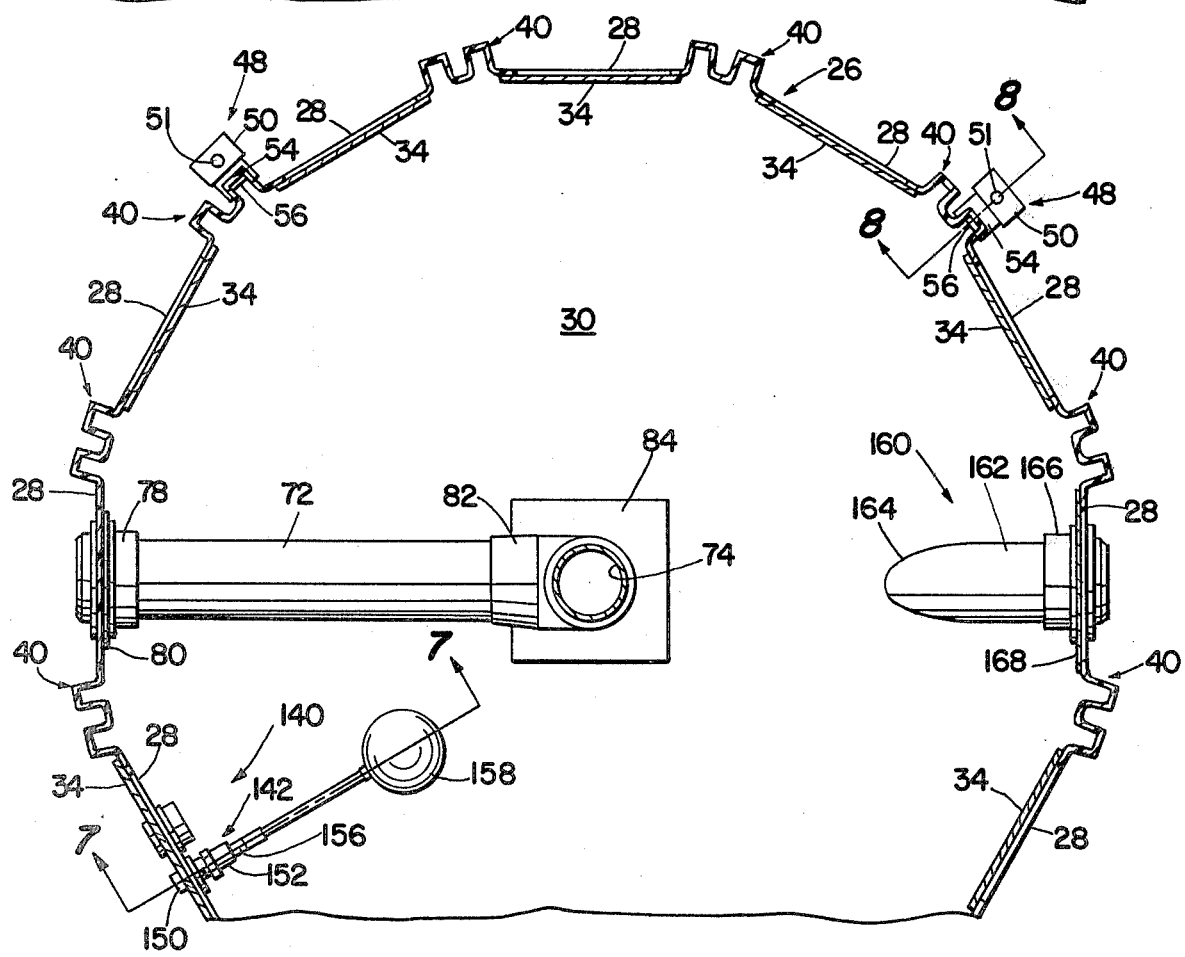
FIG. 5 is a cross-sectional view of the cooling tower according to the invention, taken along a plane indicated by line 5—5 in FIG. 3.

The corrugations 40 extend completely from the transition region 31 to the base 30 where attachment of the shell 20 to the pad 12 is carried out by means of anchor lugs 48. Referring particularly to FIGS. 5 and 8, four anchor lugs 48 are provided. Each of the anchor lugs 48 includes an L-shaped bracket 50 having an opening 51 for direct attachment to the pad 12 by means of fasteners (not shown). The bracket 50 is welded as at 52 to a plate 54 in contact with one of the corrugations 40. A backup plate 56 is disposed within the shell 20 in order to provide reinforcement for the portion 44 to which the plate 54 is secured. The plates 54 are connected to the backup plates 56 and the portions 44 by means of bolted fasteners 58. The attachment hardware thus described is formed of aluminum to minimize corrosion.

II. The Water Distribution System 70

The water distribution system 70 includes an inlet pipe 72, a vertically oriented pipe 74, and a rotatable sprinkler pipe assembly 75 having a plurality of sprinkler pipes 76. Heated water is directed into the inlet pipe 72 under pressure, is pumped upwardly through the vertically oriented pipe 74, and is discharged through the sprinkler pipes 76. The reaction producted by water exiting the sprinkler pipes 76 causes the sprinkler pipes 76 to rotate about the vertically oriented pipe 74, thereby producing an even distribution of water within the shell 20.

Virtually all components of the water distribution system 70 are manufactured of polyvinyl chloride (PVC) plastics material. The PVC material has exceptionally long life and few maintenance requirements. The PVC material offers efficient cooling, is lightweight, and it cannot corrode. The inlet pipe 72 extends through an opening in one of the walls 28 and is held by means of a fitting 78. A gasket 80 is compressed between the fitting 78 and the wall 28 in order to insure a water-tight seal. Referring particularly to FIG. 11, the other end of the inlet pipe 72 is secured to the pipe 74 by means of an elbow 82. The elbow 82 is disposed atop a base plate 84. The base plate 84 is located at the center of the base 30 and is secured there by a plastics welding material 86. A closure plug 88 is fitted within the bottom of the elbow 82 in order to provide a water-tight seal.

The vertically oriented pipe 74 includes a collar 90 positioned approximately midway along its length. The collar 90 provides support for the heat exchanger 120.

The upper end of the pipe 74 includes a sprinkler head 92 to which a hub 94 is rotably secured. Referring particularly to FIGS. 2-4, 6, and 14, the sprinkler pipes 76 are secured to the hub 94 and radiate outwardly from the hub 94. The sprinkler pipes 76 are equidistantly spaced from each other. Because six sprinkler pipes 76 have been provided, the angle between adjacent sprinkler pipes 76 is 60 degrees. Each of the sprinkler pipes 76 includes a plurality of openings 96 spaced along its length. The end of each pipe 76 is closed by a cap 98. The pipes 76 are secured to the hub 94 such that the centerline of the openings 96 are positioned at approximately a 10° angle from the vertical. This is indicated in FIG. 6 by the angle "A". The pipes 76 are connected to the hub 94 such that all of the openings 96 in all of the pipes 76 are positioned in the same direction away from the vertical. Accordingly, upon supplying water through the pipes 72, 74, water will flow outwardly through the pipes 76 and will be contained within the pipes 76 by the cap 98. Water will exit through the openings 96 and, due to the jet reaction provided by the escaping water, the pipes 76 will be caused to rotate about the vertical centerline of the hub 94. It will be appreciated to those skilled in the art that the size of the openings 96, their locations along the length of the pipes 76, and the angle A can be selected to produce a desired distribution of water. The foregoing variables can be selected such that the pipes 76 will rotate very slowly, approximately five revolutions per minute, and so that a greater amount of water will be distributed toward outer portions of the shell 20 in order to produce even saturation of the heat exchanger 120.

A low pressure drop mist eliminator system is provided to reduce or eliminate visible water particles being carried away by air exiting the tower 10. The mist eliminator system is in the form of aluminum blades 100 secured to the pipes 76. Referring particularly to FIGS. 4, 6, and 14, the blades 100 include a generally rectangular portion 102 having a downwardly oriented trailing edge 104, a curved portion 106 extending over the pipes 76, and a short leading edge 108. The blades 100 are secured to the pipes 76 by means of clamps 110. The blades 100 have been found to produce sufficient localized quiescence that much, if not all, of visible water moisture is eliminated while, at the same time, a minimal pressure drop is created.

In order to be able to inspect the water distribution system 70, an inspection window 112 is provided in the upper portion 22 at the vertical location where the pipes 76 are located. The inspection window 112 is closed by a water-impervious cover 114 secured to the shell 20 by means of thumb screws 116.

III. The Heat Exchanger 120

The heat exchanger 120 is in the form of a block of cellular packing disposed within the shell 20. The heat exchanger 120 includes a plurality of individual layers 122 of PVC fill material providing a large surface area for maximum contact between heated water and cooling air. Referring particularly to FIGS. 2-4, the layers 122 are annular, disc-like structures, each having an outer diameter approximating that of the upper portion 22, and a centrally located opening having a diameter approximating that of the pipe 74. The layers 122 are stacked atop each other and are supported within the shell 20 atop a Z-shaped ledge 124 included as part of the transition region 31. Referring particularly to FIGS. 9 and 10, a support 126 is positioned on the ledge 124 in contact with the lowermost layer 122. The support 126 includes a plurality of radially extending legs 128 (FIG. 3), each of which is supported at one end by the collar 90 and at the other end by the ledge 124.

The ledge 124, the collar 90, and the support 126 effectively support the heat exchanger 120 within the shell 20 without the need for potentially rust-susceptible fixtures. Because the layers 122 extend radially outwardly to completely fill the upper portion 22, some water will flow downwardly through the layers 122 immediately adjacent the inner surface of the upper portion 22. As this water travels downwardly, it eventually will encounter the ledge 124 where it will flow downwardly into the region of the air inlets 32. It is possible for water to remain in contact with the lower portion 26 and even to flow outwardly of the air inlets 32 through the screens 34. In order to avoid this undesirable result, a plurality of plate-like deflectors 130 are secured to the walls 28 near their intersection with the Z-shaped ledge 124. The deflectors 130 are positioned outwardly of the walls 28 at an angle of approximately 45 degrees. The total length of the deflectors is quite small, approximately four inches in the embodiment illustrated. The deflectors are provided with a sharpened edge 132. Accordingly, when water flows downwardly from the ledge 124, it will encounter the deflectors 130 and will fall directly into the base 30 without further contacting the walls of the shell 20.

IV. The Water Control Fixtures 140, 160

Referring particularly to FIGS. 5 and 7, a first water control fixture 140 includes a so-called makeup valve assembly 142, an overflow connection 144, and a drain connection 146. The valve assembly 142 and the connections 144, 146 extend through openings formed in one of the walls 28. A water-tight connection is provided by gaskets 148 disposed intermediate the wall 28 and the assembly 142 and the connections 144, 146.

The makeup valve assembly 142 includes a fitting 150 for connection to a supply of water, a valve 152 for controlling the flow of water, a discharge 154 for directing water into the base 30, a fulcrum arm 156 for controlling operation of the valve 152, and a float ball 158 for sensing the level of water in the base 30. Appropriate plugs (not shown) are employed to open or close the connections 144, 146 when necessary.

The second plumbing fixture 160 (FIGS. 3 and 5), includes a short section of pipe 162 having a beveled end 164, a fitting 166, and a gasket 168. The fitting 166 extends through an opening formed in one of the walls 28. The pipe 162 is approximately 8 inches in diameter and is used to discharge cooled water from the tower 10.

V. The Air Exhaust Device 180

Referring particularly to FIGS. 1-3 and 13, the air exhaust device 180 includes a fan 182, braces 183, a drive motor 184, a vertically oriented drive shaft 186, and a plurality of V-belts 187 connecting the motor 184 and the drive shaft 186. The fan 182 is an axial flow fan having four fixed pitch, cast aluminum airfoil blades 188. The blades 188 are disposed within a fan discharge ring 190 secured to the conical end portion 24 by means of bolted fasteners 192. An annular support ring 192 is affixed to the uppermost portion of the fan discharge ring 190 by welds indicated at 194. Annular support elements 196, 198 are secured to the support element 192 by bolted fasteners 200. A galvanized or plastic-coated fan guard 202 is attached to the supporting element 198 and completely encloses the fan 182, the motor 184, the drive shaft 186, and the V-belts 187.

Remote lubrication lines 204 are provided to enable the movable components of the air exhaust device 180 to be lubricated without removing the guard 202 and without shutting down the motor 184. In order to provide convenient access to the upper portion of the tower 10, a ladder 206, a platform 208, and guard rails 210 are provided.

VI. Operation Of The Cooling Tower 10

When it is desired to operate the tower 10, the following steps are carried out:

(1) the motor 184 and the drive shaft 186 are aligned and spaced so that the V-belts 187 are properly aligned and are under proper tension.

(2) The motor 184 is wired for the correct direction of rotation of the fan blades 188 and the fan bearings are lubricated by use of the lubrication lines 204.

(3) The base 30 is filled with cold water to the overflow level defined by the overflow connection 144.

(4) The fulcrum arm 156 of the makeup valve assembly 142 is adjusted so that the center of the float ball 158 is positioned approximately 10 inches from the base 30.

(5) A pressure gauge (not shown) is installed immediately upstream of the fitting 78. Heated water under pressure then is pumped through the pipe 72, into the pipe 74, and into the pipes 76 where it is discharged through the openings 96.

(6) The fan motor 184 is started to produce a flow of air upwardly through the tower 10.

(7) Heated water is discharged from the nozzles 96 and contacts the heat exchanger 120. The water falls through the successive layers 122 of PVC film material where it is cooled due to contact with upwardly flowing air. Water passing through the lowermost layer 122 drips into the base 30.

(8) Eventually, cooled water flows outwardly through the plumbing fixture 160 for downstream utilization and eventual recirculation, if desired, or for other purposes.

(9) It is possible that the water level in the base of the shell 20 may fall due to normal losses caused by bleed off, drift, or evaporation. In that event, the float 158 will fall and cause the valve 152 to supply more cold water into the shell 20 through the discharge 154. Normal operation of the tower 10 continues.

As will be apparent from the foregoing description, a cooling tower according to the invention combines the advantages of an induced draft, counterflow cooling tower with those of a plastics construction. The unitary, seamless shell according to the invention is completely corrosion-resistant for long life and minimal maintenance. The shell is far less expensive than prior shells, is as strong as a steel shell, but has only approximately half the weight. The cooling tower according to the invention is very easy to transport and install in one piece. In addition to the shell, many of the components of the tower are formed of corrosion-resistant materials such as PVC and aluminum, thereby reducing maintenance and extending the life of the tower.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. In a cooling tower wherein a heat exchanger in the form of a block of cellular packing is disposed and wherein fluid to be cooled is passed through the packing and cooling air is passed through the packing, the improvement comprising:
   a unitary, seamless shell fabricated from a plastics material, the shell having a generally cylindrical upper portion and a polygonal lower portion, the lower portion including a plurality of air inlet openings and strengthening sections intermediate the air inlet openings, the air inlet openings being formed in flat wall portions of the lower portion, the strengthening sections being in the form of corrugations, the corrugations and the remainder of the shell being of substantially uniform wall thickness.

2. A shell included as part of a cooling tower, the shell capable of standing alone without the need for supplementary support members and capable of supporting an air exhaust device, the shell comprising a unitary, seamless structure fabricated from a plastics material, the shell having a generally cylindrical upper portion and a lower portion, the lower portion including a plurality of air inlet openings and strengthening sections intermediate the air inlet openings, the strengthening sections, when viewed in cross section, being in the form of corrugations, the lower portion, including the corrugated strengthening sections, being of substantially uniform wall thickness.

3. A counterflow, induced draft cooling tower, comprising:
   (a) a unitary, seamless shell fabricated from a plastics material, the shell having a generally cylindrical upper portion and a lower portion, the lower portion including a plurality of air inlet openings and strengthening sections intermediate the air inlet openings, the strengthening sections, when viewed in cross-section, being in the form of corrugations;
   (b) a water distribution system for directing heated fluid into the tower, the water distribution system including a rotatable sprinkler pipe for distributing fluid uniformly within the tower;
   (c) a heat exchanger disposed within the tower, the heat exchanger being in the form of a block of cellular packing having a large surface area to establish thorough contact between cooling air and heated fluid; and
   (d) an air exhaust device in fluid communication with the upper portion of the tower, the air exhaust device capable of inducing a flow of air upwardly through the tower in a direction opposite to that of the flow of water.

4. The cooling tower of claim 3, wherein the plastics material is polyethylene.

5. The cooling tower of claim 3, wherein the lower portion of the shell is polygonal and the air inlet openings are provided in the flat wall portions.

6. The cooling tower of claim 3, wherein the lower portion, including the corrugated portions, is of uniform wall thickness.

7. The cooling tower of claim 3, wherein a transition region is provided between the upper and lower portions, the transition region including a ledge, the ledge being capable of supporting the packing at a desired vertical position within the shell.

8. The cooling tower of claim 3, wherein the upper portion includes a flanged surface for attachment of the air exhaust device.

9. The cooling tower of claim 3, wherein the water distribution system includes an inlet pipe positioned adjacent the base of the tower, a vertically extending pipe in communication with the inlet pipe, the vertically extending pipe extending through the heat exchanger, and a plurality of rotatable sprinkler pipes in communication with the vertically extending pipe, the sprinkler pipes being rotatable about an axis extending through the centerline of the vertically extending pipe.

10. The cooling tower of claim 9, further including a mist eliminator in the form of a blade secured to each sprinkler pipe, the blade including a downwardly turned trailing edge, the mist eliminator establishing sufficient localized quiescence in the exhaust flow of the tower that visible moisture tends not to be discharged from the tower.

11. The cooling tower of claim 3, further including a drain connection formed near the base of the shell, an overflow connection formed in the shell at a predetermined distance above the base of the shell, and a valve assembly for controlling the addition of fluid into the shell to make up losses.

12. The cooling tower of claim 11, wherein the valve assembly includes a sensing means to detect the level of fluid in the shell, the sensing means being in the form of a float ball connected to a fulcrum arm, the fulcrum arm being capable of controlling the valve to permit or prevent the addition of fluid into the shell.

13. A counterflow, induced draft cooling tower, comprising:
   (a) a unitary, seamless shell fabricated from polyethylene, the shell having a generally cylindrical upper portion and a polygonal lower portion, the lower portion including a plurality of air inlet openings in the flat wall portions and strengthening sections intermediate the air inlet openings, the strengthening sections, when viewed in cross section, being in the form of corrugations, the lower portion, including the corrugated portions, being of substantially uniform wall thickness;
   (b) a heat exchanger disposed within the tower, the heat exchanger being in the form of a block of cellular packing having a large surface area to establish thorough contact between cooling air and heated water, the heat exchanger being supported at a desired vertical position within the shell by a ledge, the ledge being formed in a transition region between the upper and lower portions of the shell;
   (c) a water distribution system for directing heated water into the tower, the water distribution system including an inlet pipe positioned adjacent the base of the tower, a vertically extending pipe in communication with the inlet pipe, the vertically extending pipe extending through the heat exchanger, and a plurality of rotatable sprinkler pipes in communication with the vertically extending pipe, the sprinkler pipes being rotatable about an axis extending through the centerline of the vertically extending pipe;
   (d) a mist eliminator in the form of a blade secured to each sprinkler pipe, the blade including a downwardly turned trailing edge, the mist eliminator establishing sufficient localized quiescence in the exhaust flow of the tower that visible moisture tends not to be discharged from the tower;

(e) an air exhaust device in fluid communication with the upper portion of the tower, the air exhaust device including a motor-driven fan secured to the upper portion of the shell by means of a flanged surface included as part of the shell;

(f) a drain connection formed near the base of the shell;

(g) an overflow connection formed in the shell at a predetermined distance above the base of the shell; and (h) a valve assembly for controlling the addition of water into the shell to make up losses, the valve assembly including a sensing means to detect the level of water in the shell, the sensing means being in the form of a float ball connected to a fulcrum arm, the fulcrum arm being capable of controlling the valve to permit or prevent the addition of water into the shell.

* * * * *